United States Patent
Svec

(10) Patent No.: US 11,873,089 B2
(45) Date of Patent: Jan. 16, 2024

(54) POWERED PARAGLIDING HARNESS

(71) Applicant: Miroslav Svec, Komárno (SK)

(72) Inventor: Miroslav Svec, Komárno (SK)

(*) Notice: Subject to any disclaimer, the term of this patent is extended or adjusted under 35 U.S.C. 154(b) by 0 days.

(21) Appl. No.: 17/864,652

(22) Filed: Jul. 14, 2022

(65) Prior Publication Data

US 2023/0027049 A1 Jan. 26, 2023

(30) Foreign Application Priority Data

Jul. 21, 2021 (EP) ..................... 21187037

(51) Int. Cl.
*B64C 31/036* (2006.01)

(52) U.S. Cl.
CPC .................. *B64C 31/036* (2013.01)

(58) Field of Classification Search
CPC ..................................... B64C 31/036
See application file for complete search history.

(56) References Cited

U.S. PATENT DOCUMENTS

| 2015/0217853 A1* | 8/2015 | Svec | B64C 39/026 244/4 A |
| 2023/0027049 A1* | 1/2023 | Svec | B64C 31/028 |

FOREIGN PATENT DOCUMENTS

| CZ | 2003-3471 A3 | 8/2005 |
| CZ | 295432 * | 8/2005 |
| DE | 39 14 470 A1 | 11/1990 |
| DE | 20 2016 006 522 U1 | 12/2016 |
| DE | 10 2019 001 968 A1 | 9/2020 |

OTHER PUBLICATIONS

Extended European Search Report dated Jan. 4, 2022 in European Application No. 21187037.3.

* cited by examiner

*Primary Examiner* — Justin M Benedik
(74) *Attorney, Agent, or Firm* — Collard & Roe, P.C.

(57) ABSTRACT

A powered paragliding harness includes a harness with a pilot's back rest and an engine mount carrying a power unit with propeller. The back rest and engine mount are connected via at least first and second levers. Hinged connections connect one end of each to the back rest and the other end to the engine mount. The first lever is shorter than the second. In the harness operational state, the first lever is above the second. The levers enable the transition between an upright position, where the back rest—propeller angle is small, especially back rest and propeller are or close to parallel, for an upright pilot position during take-off/landing, and a reclined position, where the back rest—propeller angle is larger, for a reclined pilot position. The second lever—engine mount connection is nearer to the power unit center of gravity than the first lever—engine mount connection.

11 Claims, 5 Drawing Sheets

POWERED PARAGLIDING HARNESS

CROSS REFERENCE TO RELATED APPLICATIONS

Applicant claims priority under 35 U.S.C. § 119 of European Application No. 21187037.3 filed Jul. 21, 2021, the disclosure of which is incorporated by reference.

BACKGROUND OF THE INVENTION

1. Field of the Invention

The invention relates to a powered paragliding harness, comprising a harness including a back rest for the pilot's back and an engine mount carrying a power unit including a propeller.

The invention thus relates to aviation, specifically to foot-launched powered paragliding. Powered paragliding uses air-inflated wings to generate lift, a harness to seat the pilot and a power unit to generate forward thrust. The power unit is commonly a combustion or electric engine (motor) with a propeller or set of propellers.

No matter what motor (combustion or electric engine) is used for creating the power, in order to provide forward thrust the propeller needs to stay ideally in vertical position, still acceptable up to 10-15 degrees reclined from vertical position. Pilots usually prefer to stay in a reclined position during flight. Reclined position is more comfortable, provides better feedback from the glider and more authority to steer the glider with weight-shift. In order to achieve both the reclined position of pilot's back and the vertical position of the motor and propeller, the desired angle between the back of the pilot and the engine/propeller is around 40 degrees. To hold the weight of the motor and propeller and to keep them in the correct position there needs to be a rigid construction integrated into or attached onto the harness.

In order to achieve both a comfortable reclined position for the pilot while flying and an ideal thrust line during flight and during take-off, the harness with power unit must have a variable geometry changing the angle between pilot's back and propeller from around 0 to around 40 degrees.

2. Description of the Related Art

Most paramotors today do not implement variable geometry, which means the reclined position of the pilot is not achieved and the pilot's back stays vertical during flight. Most paramotors today sacrifice the comfort and handling benefits of the reclined position for simplicity of the paramotor construction.

There are some known powered paragliding harnesses that have the variable geometry implemented. This variable geometry requires some mechanism to change the position of the engine and propeller relative to the pilot's back. Current solutions use a simple hinge where the axis of rotation of the engine is in front of and above the engine's center of gravity viewed in the direction of flight. Due to its weight, the engine will naturally tend to tilt down into parallel position. Once the take-off run is finished and the pilot gets seated and reclined in the harness, the engine and propeller would naturally tilt backwards due to gravity too. Force executed is needed to move the engine and propeller to vertical position. Continuous force or some kind of mechanical locking mechanism is needed to keep the engine in vertical position in flight. Current solutions implement the variable geometry with single hinge in two ways:

Electric (and sometimes fully automatic) solution: The engine and propeller is moved from parallel position into reclined position and back by electric servos or actuators. This transition may be initiated by the pilot pushing on an electronic controller or fully automatically by position sensors. In automatic systems the engine propeller position is constantly monitored by an electronic controller and adjusted back to vertical by electric servo motors or actuators whenever the propeller gets away from the vertical position. Such systems are fully automatic and hands-free from the pilot's perspective. The disadvantage is that such systems are very sophisticated, complicated, heavy and expensive.

Mechanic, but not automatic solution: After take-off and getting seated into the reclined position the pilot needs to adjust the position of the motor and propeller back to vertical position by initiating a lever or similar mechanism. To initiate the transition from parallel to 40 degree angle the pilot needs to execute substantial force to overcome the weight of the motor and propeller. Thus, these systems are currently used only with small and lightweight electric motors and very small experimental combustion engines from remote controlled planes. To prevent the motor and propeller from tilting back some sort of locking mechanism needs to be engaged. Accordingly, before landing, the pilot needs to manually initiate unlocking of the system and transition on to parallel setup. The major disadvantage is that the pilot needs to let go of glider controls to execute the transition, thus unable to react immediately to eventual turbulence and is exposed to increased risk. Such transition happens low to the ground after take-off or before landing which increases the risks dramatically.

SUMMARY OF THE INVENTION

It is therefore one object of the invention to provide a powered paragliding harness which overcomes the problems of prior art, that is, the harness should neither need electrical actuation nor the pilot to let go of glider controls to execute the transition from upright position to reclined position.

The invention relates to a powered paragliding harness, comprising a harness including a back rest for the pilot's back and an engine mount carrying a power unit including a propeller.

The invention is characterized in that back rest and engine mount are connected via a lever mechanism, in that the lever mechanism comprises at least a first lever and a second lever, each lever being connected with one end to the back rest via a hinged connection and with the other end to the engine mount via a hinged connection, in that the first lever is shorter than the second lever, in that in the operational status of the harness the first lever is situated above the second lever, in that the levers are arranged to enable the transition from an upright position, where the angle between back rest and propeller is small, especially back rest and propeller are parallel or close to parallel, to allow for an upright position of the pilot during take-off and landing, into a reclined position, where the angle between back rest and propeller is larger than in the upright position, to allow for a reclined position of the pilot during flight, and vice versa, and in that the connection between second lever and engine mount is situated nearer to the center of gravity of the power unit than the connection between first lever and engine mount.

When the connection between second lever and engine mount is situated near to the center of gravity of the power unit the weight of the power unit can be used to support the transition from upright position to reclined position, and vice versa. So a force based on electrical actuation or manual operation by the pilot to execute the transition from upright position to reclined position is not necessary.

Instead of upright position also the terms parallel position or vertical position are used here.

According to one embodiment of the invention the connection between second lever and engine mount is situated such that in the operational status the center of gravity of the power unit is at or below the connection between second lever and engine mount, in order to use the weight of the power unit to support the transition from upright position to reclined position, and vice versa.

According to one embodiment of the invention in the reclined position the angle between back rest and propeller is between 30 and 50 degrees, preferably between 35 and 45 degrees. So a comfortable reclined position of around 40 degrees can be obtained for the pilot.

According to one embodiment of the invention the power unit is situated on the engine mount such that in the operational status of the harness the direction of thrust, which is defined by the center of rotation of the propeller, is above the connection between second lever and engine mount, in order to use the thrust to lock the second lever in the upright position or in the reclined position. So no manual locking or locking by other actuators is needed.

In that the thrust of the propeller is used to lock the second lever a reduction in thrust can be used to unlock the second lever, so manual unlocking or an additional actuator for unlocking is not necessary.

If there is only one propeller then the center of rotation of the propeller defines the direction of thrust. If there is more than one propeller and they all have the same axis of rotation, then the direction of thrust is defined by this axis. Generally, the direction of thrust is defined by addition of the thrust vectors of the different propellers.

According to one embodiment of the invention for initiating the transition from upright position to reclined position by the pilot leaning back a traction means for transmitting force from the back rest to the lever mechanism using the main carabiner of the harness is provided. The traction means comprises e.g. a bowden cable running through the main carabiner and a bowden cable guide, or the traction means comprises at rope and pulley system.

By using a traction means which is controlled by movement of the back rest the pilot can initiate the transition from upright position to reclined position solely by leaning back. No servos or actuators or additional rigid levers are needed, and the pilot does not need his hands, so the pilot need not let go of glider controls to initiate transition.

According to one embodiment of the invention in the upright position the first lever is oriented upwards from the hinged connection with the back rest to the hinged connection with the engine mount, and the second lever is oriented upwards from the hinged connection with the back rest to the hinged connection with the engine mount, the second lever being parallel or close to parallel to the back rest. Thus, the propeller can be close to the back rest.

According to one embodiment of the invention in the reclined position the first lever is oriented downwards from the hinged connection with the back rest to the hinged connection with the engine mount, and the second lever is oriented horizontal or close to horizontal. The horizontal or close to horizontal orientation of the second lever can advantageously be used to lock the second lever in this position by the thrust of the propeller(s).

So the invention provides for a reclined paragliding harness with automatic mechanical adjustment of propeller position which uses a three-bar linkage mechanism, here called lever mechanism, which mechanism moves the center of gravity of the engine and propeller in a non-linear non-circular trajectory.

The first benefit of this mechanism compared to a single hinge is that it places the effective center of rotation of the power unit close to its center of gravity. This substantially reduces forces needed to initiate the transition.

The second benefit of the three bar linkage mechanism is that no force is needed to keep the power unit in vertical position once that is achieved. The power unit and propeller have their stable equilibrium position in the vertical position in both scenarios, that is both when the pilot is upright on take-off/landing and when the pilot is reclined during flight.

Third benefit of the three bar linkage mechanism is that not just gravity of the power unit but also eventual thrust of the propeller will lock the mechanism in a position with engine and propeller being vertical in both scenarios, that is when the pilot is in the upright position during take-off/landing and also when the pilot is reclined during flight.

During take-off and landing, when the pilot is upright, the center of gravity of the power unit will have a natural tendency to move down, pushing the lower (second) lever into vertical position until it is stopped, e.g. by a stopper, as illustrated in FIG. 5. Thus, the power unit is vertical and parallel or close to parallel to the back of the pilot, or his backrest, respectively. If power is applied, the thrust vector, see direction of thrust 13 in FIGS. 5 and 6, will push the lower (second) lever into the stopper keeping the power unit vertical. Thus, the power unit is in a stable equilibrium position in respect to both gravity and thrust during take-off. No pilot's input, power or locking mechanism is needed to keep it in such a position.

When the pilot gets seated and reclined backwards the gravity of the power unit will move the lower (second) lever into horizontal, or close to horizontal, position as illustrated in FIG. 6 where it will e.g. hit a stopper again, creating an angle of around 40 degrees between pilot's back and engine mount. Again, the power unit will stay in this stable equilibrium position by gravity of the engine and propeller. If thrust is applied, thrust will lock the three-bar linkage mechanism with the motor and propeller in vertical position without any effort needed from the pilot.

Thus, the motor and propeller naturally stay in vertical position by engine gravity and engine thrust without any input or effort from the pilot.

So the proposed reclined paragliding harness with automatic mechanic adjustment of propeller position provides for the following advantages:

It performs full transition from motor and propeller being parallel to pilot's back to a reclined position, e.g. 40 degree angle between them, when the pilot moves from upright position into reclined position. This allows safe take-off and landing posture of the pilot upright with propeller parallel to his back and comfortable reclined posture in flight with the propeller still vertical.

It performs said transition fully mechanically without the need of servo motors, actuators, batteries and controllers.

It performs said transition fully automatically and hands-free when pilot leans backwards.

It performs that transition effortlessly even with heavier engines.

Wherever it is referred to parallel or upright or vertical position, it means a position of the propeller from 0 to 15 degrees to pilot's back.

Wherever it is referred to a reclined position, it means a position with 30 to 50 degrees angle between the engine with propeller and pilot's back.

Wherever it is referred to a transition from upright to reclined position also the transition from reclined to upright position for landing is meant.

Wherever it is referred to variable geometry a system is meant that is capable of keeping both pilot's back and propeller vertical or substantially vertical during take-off and landing and keep the pilot's back reclined while keeping propeller vertical or substantially vertical during flight.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
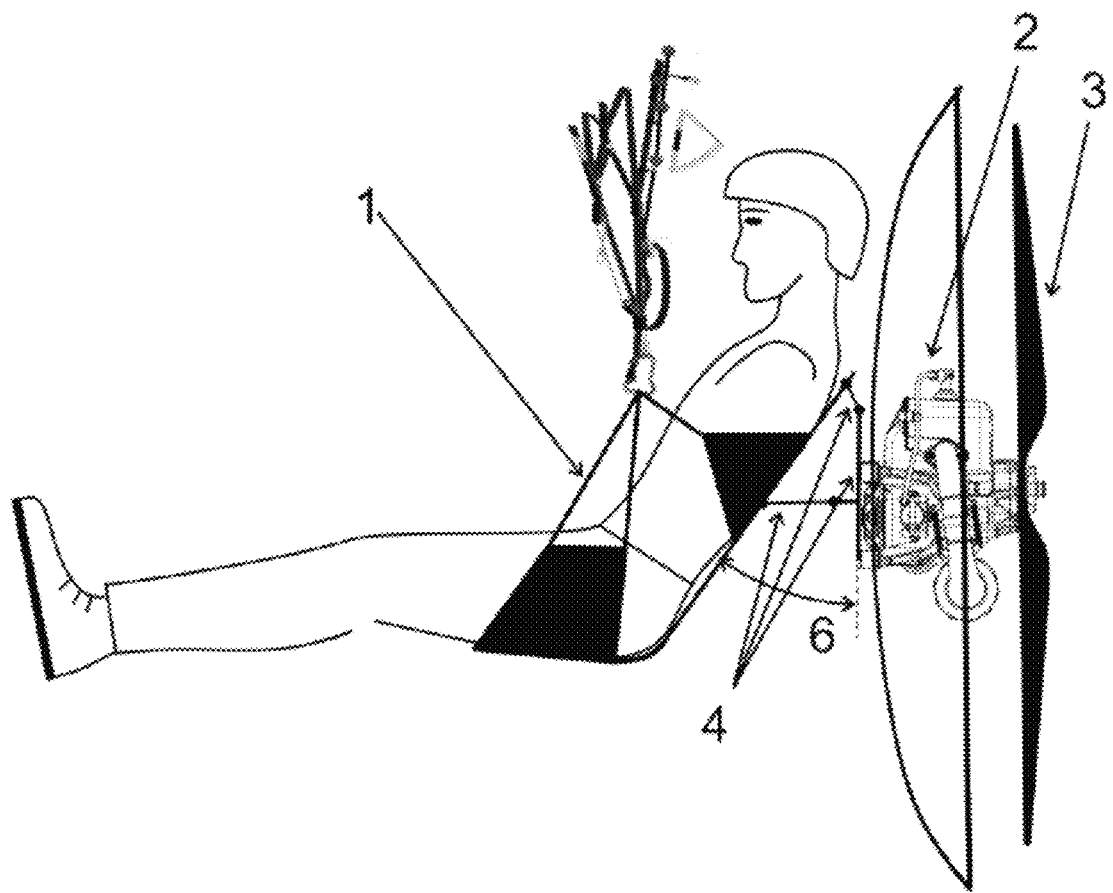
FIG. 1 shows a schematic side view of a pilot in a harness according to the invention in reclined position during flight.

FIG. 1 shows a harness 1 where a pilot is seated. Pilot and harness 1, more exactly its lever mechanism 4, are in reclined position 6. The harness 1 has a power unit 2, which comprises and electric or a combustion engine and a propeller 3. The weight of the engine and propeller 3 is carried by a rigid structure (see engine mount 10 in FIGS. 3 and 4) that is integrated inside the back part of the harness 1 or installed onto the back part of the harness 1. This rigid structure prevents the engine from sagging down along the pilot's back. The rigid structure (engine mount 10) holding the lever mechanism 4 with the engine needs to be mounted into or onto the harness 1 strongly enough to withstand higher G forces during flight maneuvers. The harness 1 is suspended from a carabiner, the main carabiner 11, see FIGS. 6 and 7, which itself is suspended from the glider.

Figure 2:
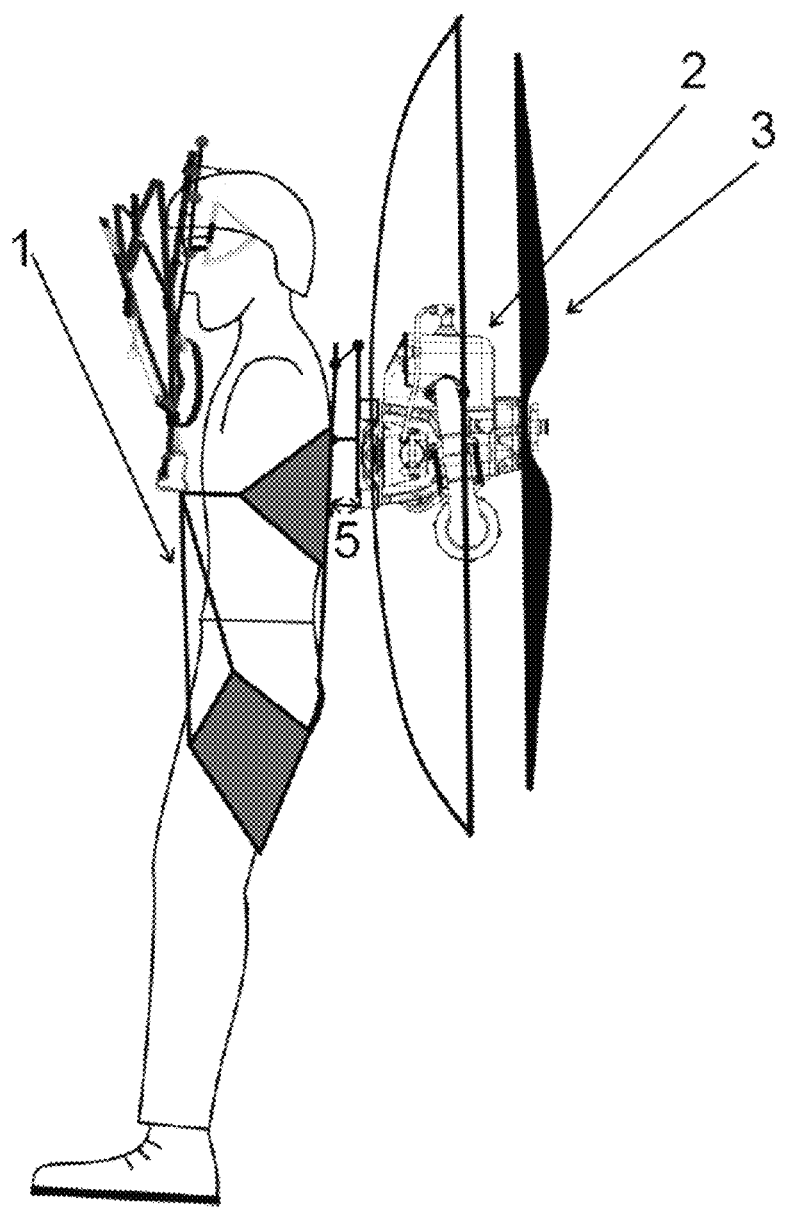
FIG. 2 shows a schematic side view of a pilot in a harness according to the invention in upright position during take-off and landing.

FIG. 2 shows the same harness 1 with pilot as FIG. 1, however, pilot and harness 1, more exactly its lever mechanism 4, are in upright position 5. The propeller 3 in FIG. 1, as well as in FIG. 2, is always in vertical or almost vertical position.

Figure 3:
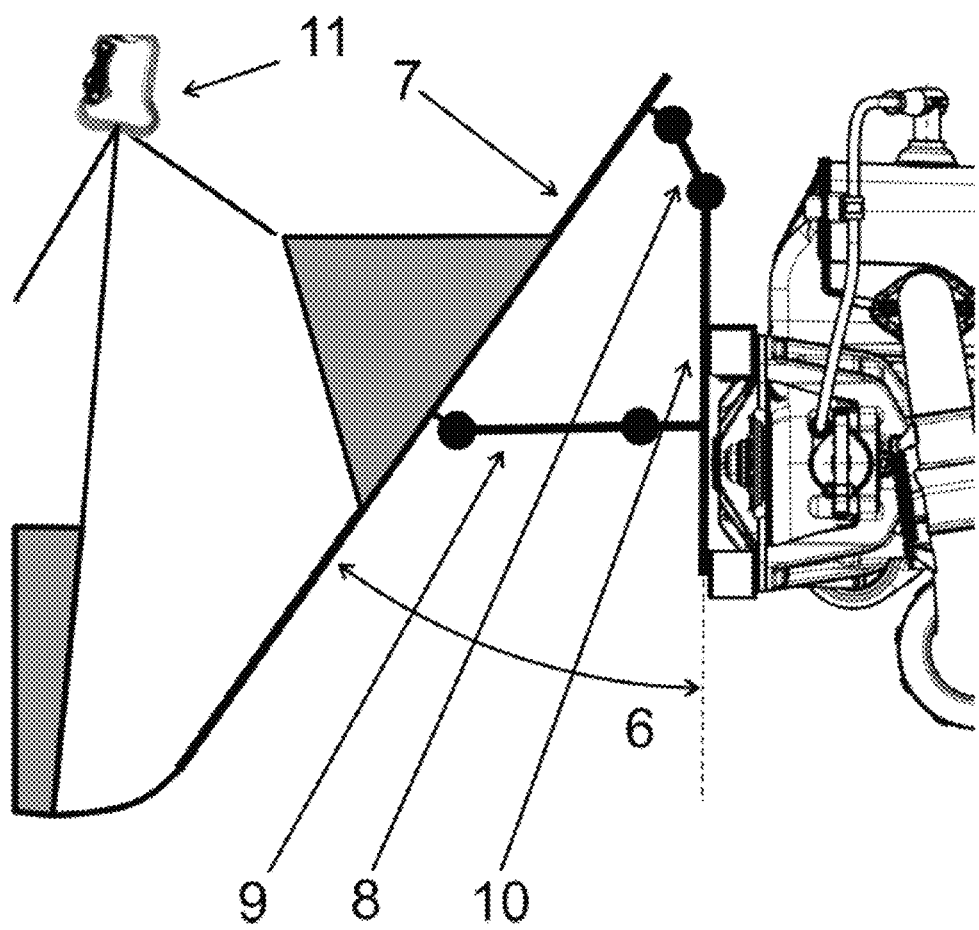
FIG. 3 shows a schematic side view of the lever mechanism in FIG. 1.

In FIG. 3 the lever mechanism 4 of FIG. 1 in reclined position 6 is shown in greater detail. The harness 1 includes a back rest 7 for the pilot's back and an engine mount 10 carrying a power unit 2 including the propeller 3. Back rest 7 and engine mount 10 are connected via the lever mechanism 4, which comprises at least an—upper—first lever 8 and a—lower—second lever 9. Each lever 8,9 is connected with one end to the back rest 7 via a hinged connection, and with the other end to the engine mount 10, via a hinged connection. The first lever 8 is shorter than the second lever 9, here the second lever 9 is between two- to three-times the length of the first lever 8. The relative length of the levers 8,9 defines the angle between back rest 7 and propeller 3.

In the reclined position 6 the first lever 8 is oriented downwards from the hinged connection with the back rest 7 to the hinged connection with the engine mount 10. The first lever is more vertical than horizontal in this position. The second lever 9 is oriented horizontally or close to horizontal.

Figure 4:
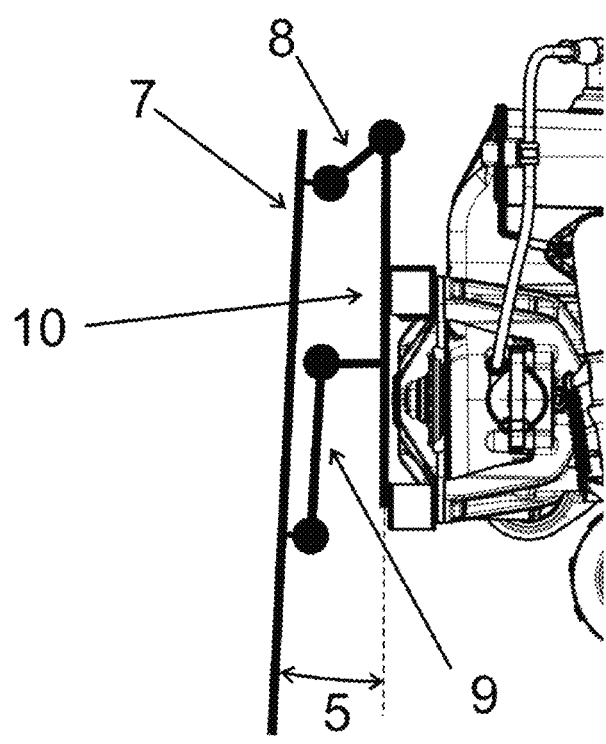
FIG. 4 shows a schematic side view of the lever mechanism in FIG. 2.

In FIG. 4 the lever mechanism 4 of FIG. 2 in upright position 5 is shown in greater detail. Here, the first lever 8 is oriented upwards from the hinged connection with the back rest 7 to the hinged connection with the engine mount 10. The first lever 8 is approximately orientated between vertical and horizontal. The second lever 9 is oriented vertical or close to vertical.

Figure 5:
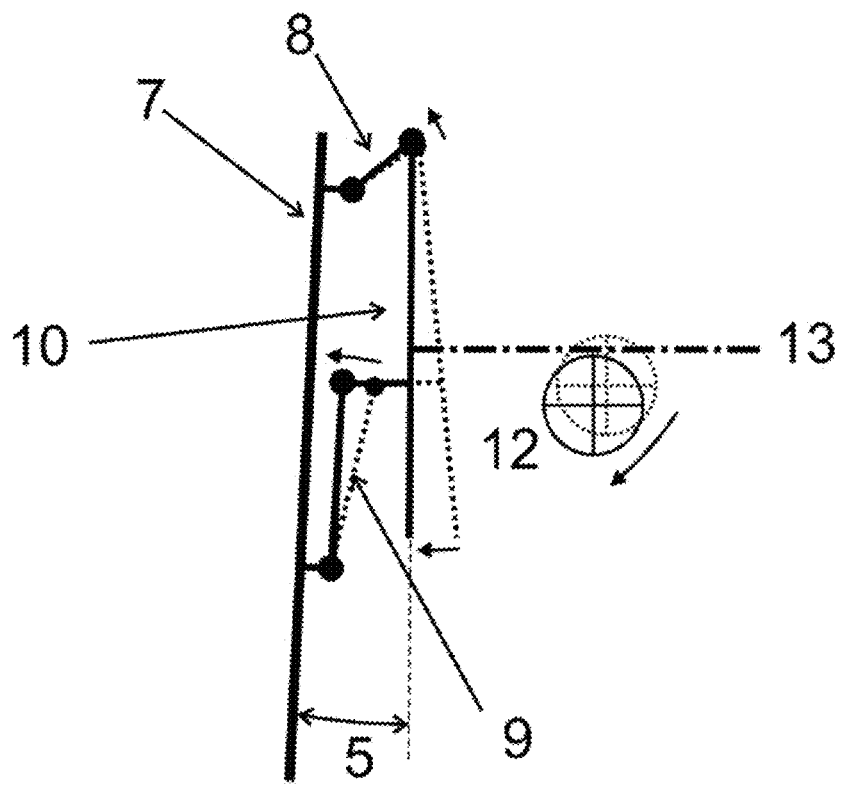
FIG. 5 shows a schematic side view of the lever mechanism with the power unit gravitating into stable equilibrium in upright position.

FIG. 5 shows the lever mechanism 4 with the power unit, depicted only in form of its center of gravity 12, gravitating into stable equilibrium in upright position 5. Here in upright position 5 the center of gravity 12 of the power unit 2 is at or below the connection between second lever 9 and engine mount 10. During take-off and landing, when the pilot is upright, the center of gravity 12 of the power unit 2 will have a natural tendency to move down, pushing the second lever 9 from a position shown in dotted lines into vertical position, see arrows, until it is stopped, e.g. by a stopper (not shown). So the engine mount 10, and thus power unit 2 and propeller 3, are vertical and parallel or close to parallel to the back rest 7. If power is applied, the thrust vector, see direction of thrust 13, will push the upper end of second lever 9 into the stopper, keeping the second lever 9, the power unit 2, the back rest 10 and the propeller 3 vertical. Thus, the power unit 2 is in a stable equilibrium position in respect to both gravity and thrust during take-off. No pilot's input, power or locking mechanism is needed to keep it in such a position.

Here the thrust vector, shown in form of the direction of thrust 13, is above the connection between second lever 9 and engine mount 10, in order to use the thrust to lock the second lever 9 in the upright position 5.

Figure 6:
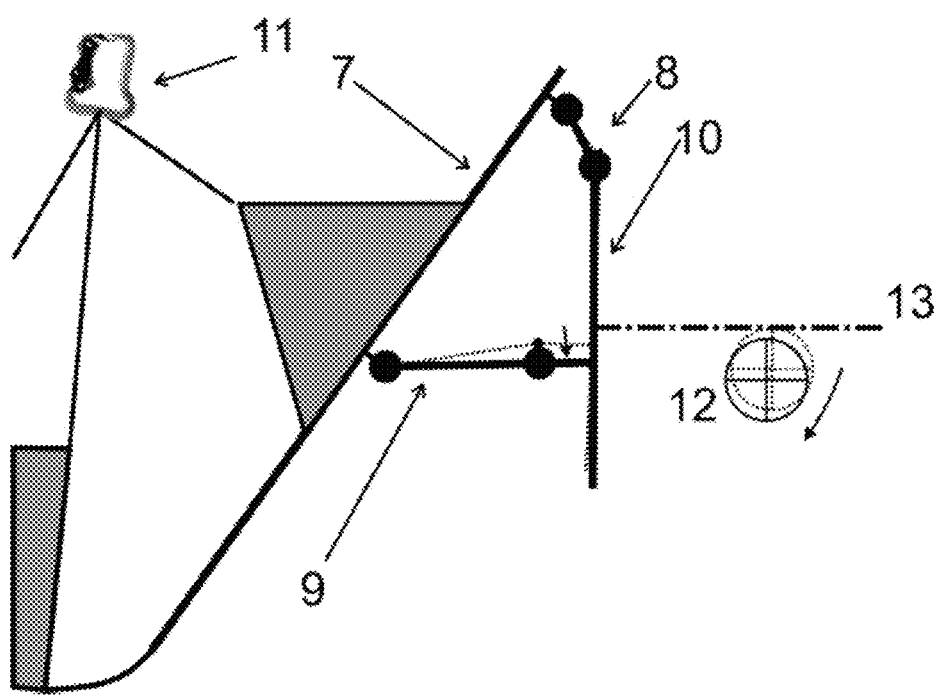
FIG. 6 shows a schematic side view of the lever mechanism with the power unit gravitating into stable equilibrium in reclined position.

FIG. 6 shows the lever mechanism 4 with the power unit 2, depicted only in form of its center of gravity 12, gravitating into stable equilibrium in reclined position 6. When the pilot gets seated and reclined backwards the gravity of the power unit 2 will move the second lever 9 into horizontal, or close to horizontal, position where it will e.g. hit a stopper, creating an angle of around 40 degrees between back rest 7 and engine mount 10. Again, the power unit 2 will stay in this stable equilibrium position by gravity of the engine and propeller 3. If thrust is applied, see direction of thrust 13, the thrust will lock the lever mechanism 4, that is, the thrust will move the engine mount 10 and the second lever 9 from a position shown in dotted lines, see arrows, into a position where the second lever 9 is oriented horizontal and the engine mount 10 is oriented vertical. Thus, the lever mechanism 4 with the motor and propeller 3 is locked in vertical position without any effort needed from the pilot.

The thrust vector, shown in form of the direction of thrust 13, is above the connection between second lever 9 and engine mount 10, in order to use the thrust to lock the second lever 9 in the reclined position 6, that is, to push the hinged connection between second lever 9 and engine mount 10 down until the second lever 9 is horizontal.

Figure 7:
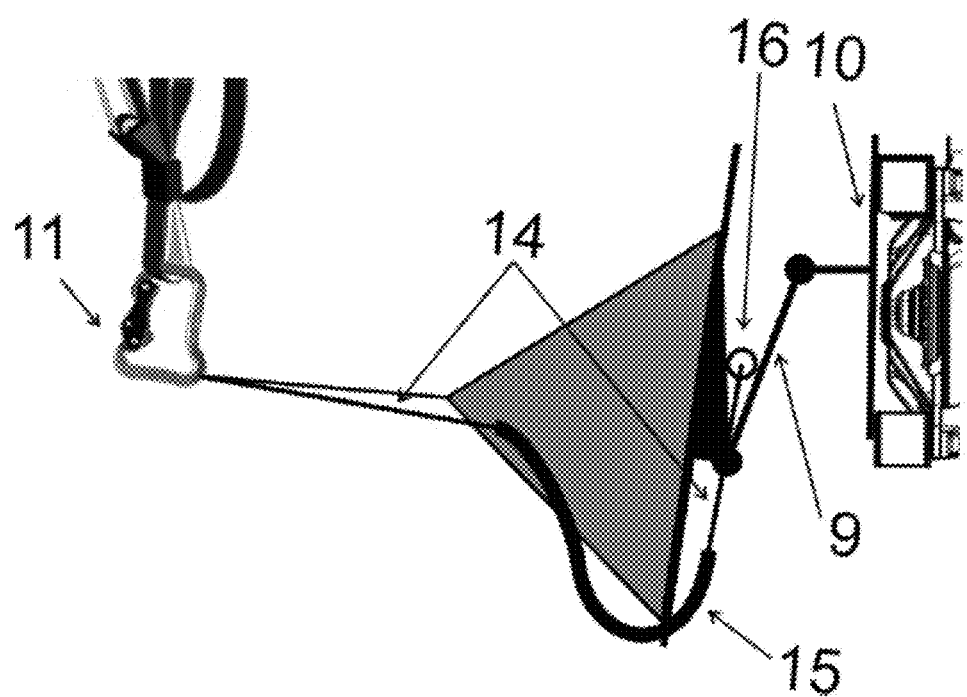
FIG. 7 shows a schematic side view of a slider mechanism initiating transition from upright position to reclined position.

FIG. 7 shows a slider mechanism initiating transition from upright position 5 to reclined position 6. The transition is initiated by the pilot reclining backwards from an upright position 5 by using a steel cable and bowden similar to brake systems on bicycles. One side of the bowden cable 14 is connected to the main carabiner 11. As the pilot reclines, the distance between pilot's back, i.e. the back rest 7, and main carabiner 11 increases thus pulling the bowden cable 14 out of the bowden cable guide 15. The bowden cable guide 15 routes the bowden cable 14 to the lever mechanism 4. A slider pin 16 is attached to the other end of the bowden cable 14. This slider pin 16 is pulled downwards by the bowden cable 14 into a V-shaped gap in between the second lever 9 and back rest 7 causing them to split apart similar to an axe splitting wood. Thus, the second lever 9 will be pushed away from the back rest 7, increasing the angle between pilot's back and the engine mount 10.

Only little initial input is necessary because as the pilot's back is getting more reclined, gravity of the engine will ensure moving the second lever 9 into horizontal position and hitting the respective stopper.

Starting from upright position 5, in the beginning the first lever 8 has very little motion. Thus, the engine mount 10 effectively rotates around the top hinge, see FIG. 5, that is around the hinged connection between first lever 8 and engine mount 10. As the center of gravity 12 of the power unit 2 is further back it actually rises a little. It does so regardless at which height it is positioned. The center of gravity 12 could be closer to the engine mount 10 or further back, it could be higher than the connection between second lever 9 and engine mount 10, or lower. Thus, the lever mechanism 4 sits in the upright position 5 by gravity.

To get the lever mechanism 4 out of this upright position 5 two things happen at the same time: the whole system reclines backwards as the pilot gets seated, and the bowden cable 14 is pulled. So the slider pin 16 slides in between back rest 7 and second lever 9.

Starting from the reclined position 6, the first lever 8 is a little closer to horizontal position. The second lever 9 is in horizontal position. Thus, any motion from this position must start upwards lifting the center of gravity 12 of the power unit 2. So the pilot needs to do two only things: reduce the power that is locking the lever mechanism 4 in that position, and lean forward.

Although only a few embodiments of the present invention have been shown and described, it is to be understood that many changes and modifications may be made thereunto without departing from the spirit and scope of the invention.

LIST OF REFERENCE SYMBOLS 1 harness
2 power unit
3 propeller
4 lever mechanism
5 upright position
6 reclined position
7 back rest
8 first lever
9 second lever
10 engine mount
11 main carabiner
12 center of gravity of the power unit 2
13 direction of thrust
14 bowden cable
15 bowden cable guide
16 slider pin

What is claimed is:

1. A powered paragliding harness comprising a harness (1) including a back rest (7) for the pilot's back and an engine mount (10) carrying a power unit (2) including a propeller (3),
  wherein the back rest (7) and the engine mount (10) are connected via a lever mechanism (4),
  wherein the lever mechanism (4) comprises at least a first lever (8) and a second lever (9), each lever (8,9) being connected with one end to the back rest (7) via a hinged connection and with the other end to the engine mount (10) via a hinged connection,
  wherein the lever mechanism (4) uses a three-bar linkage mechanism,
  wherein the first lever (8) is shorter than the second lever (9),
  wherein in the operational status of the harness (1) the first lever (8) is situated above the second lever (9),
  wherein the levers (8, 9) are arranged to enable the transition from an upright position (5), where the angle between back rest (7) and propeller (3) is small, especially back rest (7) and propeller (3) are parallel or close to parallel, to allow for an upright position of the pilot during take-off and landing, into a reclined position (6), where the angle between back rest (7) and propeller (3) is larger than in the upright position (5), to allow for a reclined position of the pilot during flight, and vice versa, and
  wherein the connection between second lever (9) and engine mount (10) is situated nearer to the center of gravity (12) of the power unit (2) than the connection between first lever (8) and engine mount (10).

2. The powered paragliding harness according to claim 1, wherein the connection between the second lever (9) and the engine mount (10) is situated such that in the operational status the center of gravity (12) of the power unit (2) is at or below the connection between the second lever (9) and the engine mount (10), in order to use the weight of the power unit (2) to support the transition from upright position (5) to reclined position (6), and vice versa.

3. The powered paragliding harness according to claim 1, wherein in the reclined position (6) the angle between the back rest (7) and the propeller (3) is between 30 and 50 degrees.

4. The powered paragliding harness according to claim 1, wherein the power unit (2) is situated on the engine mount (10) such that in the operational status of the harness (1) the direction of thrust (13), which is defined by the center of rotation of the propeller (3), is above the connection between the second lever (9) and the engine mount (10), in order to use the thrust to lock the second lever (9) in the upright position (5) or in the reclined position (6).

5. The powered paragliding harness according to claim 1, wherein for initiating the transition from the upright position (5) to the reclined position (6) by the pilot leaning back a traction means for transmitting force from the back rest (7) to the lever mechanism (4) using the main carabiner (11) of the harness (1) is provided.

6. The powered paragliding harness according to claim 5, wherein the traction means comprises a bowden cable (14) running through the main carabiner (11) and a bowden cable guide (15).

7. The powered paragliding harness according to claim 5, wherein the traction means comprises a rope and pulley system.

8. The powered paragliding harness according to claim 1, wherein in the upright position (5) the first lever (8) is oriented upwards from the hinged connection with the back rest (7) to the hinged connection with the engine mount (10), and the second lever (9) is oriented upwards from the hinged connection with the back rest (7) to the hinged connection with the engine mount (10), the second lever (9) being parallel or close to parallel to the back rest (7).

9. The powered paragliding harness according to claim 1, wherein in the reclined position (6) the first lever (8) is oriented downwards from the hinged connection with the back rest (7) to the hinged connection with the engine mount (10), and the second lever (9) is oriented horizontal or close to horizontal.

10. The powered paragliding harness according to claim 1, wherein the second lever (9) is two to three times longer than the first lever (8).

11. The powered paragliding harness according to claim 1, wherein in the reclined position (6) the angle between the back rest (7) and the propeller (3) is between 35 and 45 degrees.

\* \* \* \* \*